United States Patent [19]

Bryant et al.

[11] Patent Number: 5,066,148

[45] Date of Patent: Nov. 19, 1991

[54] BI-DIRECTIONAL OPTICAL TRANSMISSION SYSTEM FOR RF ELECTRICAL ENERGY

[75] Inventors: Paul T. Bryant, Bowie; Joseph F. Weller, Fort Washington, both of Md.; Lew Goldberg, Fairfax, Va.

[73] Assignee: The United States of America as represented by the Secretary of the Navy, Washington, D.C.

[21] Appl. No.: 560,702

[22] Filed: Jul. 31, 1990

[51] Int. Cl.$^5$ .............................................. G02B 6/28
[52] U.S. Cl. .................................................... 385/24
[58] Field of Search ...................... 350/96.16; 455/609, 455/610, 611

[56] References Cited

U.S. PATENT DOCUMENTS 3,953,727  4/1976  d'Auria et al. .................. 250/199

Primary Examiner—William L. Sikes
Assistant Examiner—Robert E. Wise
Attorney, Agent, or Firm—Thomas E. McDonnell; Edward F. Miles

[57] ABSTRACT

A bi-directional optical transmission system for radio frequency electrical energy includes first and second transmitter/receiver stations which transmit and receive light signals along an optical path therebetween. Each station includes a laser transmitter for transmitting a carrier light beam which is intensity modulated by a synchronization of an input radio frequency electrical signal. A photodetector at each station detects the intensity variations of the carrier light beam from the other station and outputs a respective radio frequency electrical signal which is synchronized with the radio frequency electrical input signal of the other station. A beam splitter is provided between the optical path at both the laser transmitter and photodetector to split the light beams incident thereon into a pass portion and angularly reflected portion. An isolator device also is provided between the laser transmitter and beam splitter to isolate the laser transmitter from back reflections. Preferably, the isolator is a Faraday isolator, and additionally or alternatively the laser transmitters transmit at widely separate wavelengths. The optical path can either be free space or a main optical fiber, and the synchronization of the input radio frequency electrical energy can either be phase synchronization or time synchronization.

16 Claims, 1 Drawing Sheet

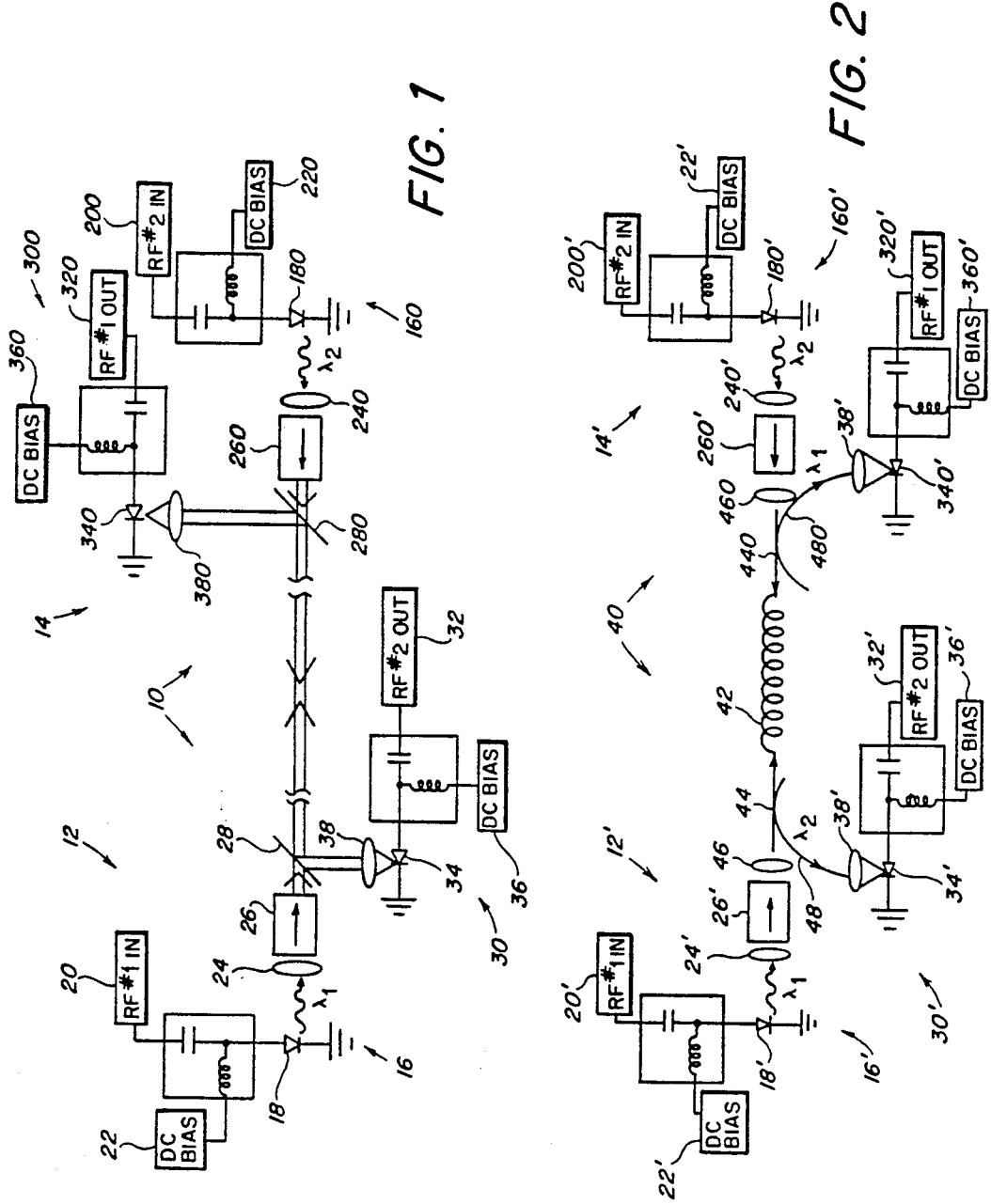

BI-DIRECTIONAL OPTICAL TRANSMISSION SYSTEM FOR RF ELECTRICAL ENERGY

FIELD OF THE INVENTION

The present invention relates generally to transmission systems for RF electrical energy, and more particularly to a bi-directional optical transmission system for RF electrical signals.

BACKGROUND OF THE INVENTION

The invention provides a solution to practical problems encountered in implementing a "cross-eye" system. "Cross-eye" is an electronic countermeasure which is described, e.g. in D. C. Schleher, Introduction to Electronic Warfare (Artech House, Dedham, Mass., 1986). Typically, a "cross-eye" system has two pair of antennae widely separated from one another. The members of each pair are located close to one another and each member of each pair is connected by a waveguide to a corresponding member of the other pair. Thus, a signal received at one of the pairs of antennae is conducted to the other pair, and retransmitted (repeated). For a "cross-eye" system to work, signals received and repeated must be phase-tracked, i.e. for a signal received at each pair of antennae a time T apart, the signal would emerge and be repeated at the other pair of antennae spaced by the same time T. Stated alternatively, phase shifting of one signal with respect to the other along the waveguides must be virtually zero (other than phase shifting intentionally imposed: cross-eye systems conventionally shift the signal in one waveguide 180° so that the repeated signals null along the line of sight of incoming signals).

To produce this virtually zero phase shifting, the electromagnetic path of each waveguide must be virtually identical. This has proved difficult in practice, particularly at higher frequencies, where extremely small distortions in one waveguide would introduce significant changes in effective path length. For example, routing of the waveguide through a crowded environment necessitates the penetration of many ship watertight bulk heads with the associated costs of cutting moderately large openings and welding at each penetration. This approach also involves the assembly of many piece parts with a result of a diminished system reliability caused by the requirement that all of the assembled pieces must remain attached at the proper tension for the waveguides to operate. The use of waveguides and/or coaxial cable also causes installation difficulties because both of these have moderate bend radius constraints. Thus, this approach was found to be difficult, cumbersome, and expensive to implement. Using one waveguide to carry both radio frequency (RF) signals in opposite directions has proved impractical because scattering by conventional RF couplers results in unacceptable interference between oppositely directed signals. Also, available RF waveguides do not have sufficient bandwidth for many applications, thus necessitating the use of separate waveguides for different frequency bands of interest. To maintain constant phase tracking between two different waveguides is a difficult engineering task. To maintain phase tracking among a plurality of waveguides is horrendously difficult.

In U.S. Pat. No. 3,953,727 (d'Auria et al.) a system for transmitting independent communication channels through a lightwave medium is disclosed. The system includes several laser diodes which supply infrared rays to quasi-transparent mirrors. These rays are focused into a fiber which conducts the rays to photodetectors. Communication can also occur in the reverse direction.

In U.S. Pat. No. 4,767,171 (Keil et al.) a transmission and reception module for a bi-directional communication network is provided. The network includes a housing containing a laser diode and a lens for focusing the output of the laser diode onto a first beam path. A second spherical lens is arranged on the first beam path for focusing the beam at a focal point at which an end of an optical fiber is positioned. A beam splitter which is at least partially transmissive to light of a first wavelength from the laser diode and partially reflective of light of a second wavelength being emitted from the fiber into a second beam path on which a detector is position is also provided. To improve the positioning, the first lens and the laser diode are mounted on a carrier member in a fixed relationship.

Also of general interest is U.S. Pat. No. 4,736,359 (Cohen et al.). This patent discloses a single fiber optical communication system which provides full-duplex, bi-directional transmission.

SUMMARY OF THE INVENTION

In accordance with the present invention, a bi-directional optical transmission system for radio frequency electrical energy is provided. This transmission system includes first and second transmitter/receiver stations which transmit and receive light signals along an optical path therebetween. Each transmitter/receiver station includes a laser transmitter means for transmitting a carrier light beam which is intensity modulated by a radio frequency electrical signal applied to the electrodes. Each station also includes a photodetector means for detecting intensity variations of the carrier light beam from the other station at the bandwidth thereof and for outputting a respective radio frequency electrical signal which is synchronized with the radio frequency electrical input of the other station. A beam splitter means is also provided between the optical path and the laser transmitter means and photodetector means. This beam splitter means splits the light beam incident thereon into a pass portion and an angular reflected portion so that the transmitter means and photodetector means do not interfere with one another. An isolator means is also provided between the laser transmitter means and the beam splitter means to isolate the laser transmitter means from back reflections.

In a preferred embodiment of the invention, the laser transmitter beams of the two stations generate laser beams having widely separated wavelengths.

In the preferred embodiment, each photodetector means includes a photodetector having an active region and a lens which focuses the light beam from the other station onto the active region of the photodetector. Each laser transmitter means is also preferably a laser diode and includes a lens which focuses the light beam generated by the laser diode.

The optical path for the laser beams can either be through free space or a main optical fiber. Where an optical fiber is used, each beam splitter includes a fiber coupler coupled to the main optical fiber and detector optical fiber extending to the photodetector means. A transmitter optical fiber is also provided which extends to the isolator means. The lens of each photodetector means is then formed at an end of the detector optical fiber. The laser transmitter means also then includes a lens which focuses the laser beam generated by a laser diode onto the isolator means and a lens which focuses the light beam exiting the isolator means into the transmitter optical fiber. The use of optical fibers provides a large bandwidth unavailable with RF hardware.

The synchronization of the input radio frequency electrical energy can be either a phase synchronization or a time synchronization.

It is an advantage of the present invention that bi-directional transmission of high frequency electrical energy between two points using light as the carrier and free space or an optical fiber as the transmission media is provided. In each embodiment, the oppositely directed signals are conducted between stations by the same waveguide (i.e. the optical fiber, or simply free space). Because the signals traverse the identically same path, they are inherently phase tracked, and one has eliminated the need to trim a pair of separate waveguides to excruciatingly fine tolerances over extremely long distances, and one has minimized the need to constantly service the waveguides to compensate for physical differences between them, which inevitably develop over time. The bandwidth of optical components available today is from D.C. to about 25 GHz. In the embodiment which employs an optical fiber to carry the oppositely directed signals, the huge bandwidth of optical fibers permits one to use a single fiber to carry all signals. This is in marked contrast to RF waveguides, whose inherently limited bandwidths typically requires the use of several waveguides for phase tracking, each waveguide dedicated to a particular sub-band of the total bandwidth of interest. Indeed, the upper frequency at which one can use this embodiment is limited only by the upper bandwidth of optics hardware, and will likely extend beyond 25 Ghz as optical technology progresses.

It is also an advantage of the present invention that phase or time synchronized transmission of high frequency electrical energy between two points using light as a transmission media is provided.

It is a further advantage of the present invention that concurrent bi-directional transmission of high frequency RF energy is provided.

Other features and advantages of the present invention are stated in or are apparent from a detailed description of presently preferred embodiments of the invention found hereinbelow.

BRIEF DESCRIPTION OF THE DRAWINGS

FIG. 1 is a schematic diagram of a bi-directional optical transmission system for RF electrical energy in accordance with the present invention.

FIG. 2 is a schematic diagram of an alternative embodiment of a bi-directional optical transmission system for RF electrical energy.

DETAILED DESCRIPTION OF THE PREFERRED EMBODIMENTS

With reference now to the drawings in which like numerals represent like elements, a first embodiment of a bi-directional optical transmission system 10 for RF electrical energy is depicted in FIG. 1. Transmission system 10 includes a first transmitter/receiver station 12 and a second transmitter/receiver station 14. Each station 12 and 14 is substantially similar to the other, and for the sake of simplicity only the structure of station 10 is recited here in detail. That a given part in station 14 corresponds to one in station 12 is indicated by labeling the part in station 14 with a reference numeral identical to its corresponding part in station 13, plus a zero. Thus laser diode 18 of station 12 corresponds to laser diode 180 of station 14. This numbering scheme is used also in FIG. 2 to indicate correspondence between parts of stations 12' and 14'.

Station 12 includes a laser transmitter means 16. Laser transmitter means 16 includes a laser diode 18 which generates a carrier light beam which is intensity modulated by a synchronization of an input radio frequency electrical signal 20 (respectively identified as RF 1 and RF 2). As shown, the RF electrical signal modulating laser diode 18 includes a DC bias 22.

The laser beam generated by each laser diode 18 is focused by a lens 24 through an isolator means which is preferably a Faraday isolator 26. After passing through Faraday isolator 26, the laser beam passes through a beam splitter 28 and is then subsequently received on the beam splitter 280 of the other station. It should be appreciated that Faraday isolators 26 are used to isolate laser diodes 18 from back reflections and incident input optical signals.

Isolator 26 can be a simple optical Faraday isolator, which passes light propagating in one direction, and strongly attenuates light propagating in the opposite direction.

An additional isolating technique which is also preferably used is to have lasers 18 generate laser beams with widely separated wavelengths $\lambda_1$ and $\lambda_2$ as shown. By using such widely separated wavelengths, one laser diode 180 does not have a gain at the wavelength of the other laser diode 18 from the other station. With this embodiment, beamsplitters 28, 280 would be specifically dichroic beamsplitters, which would allow light at a wavelength generated by laser 18 to pass through beamsplitter 28 and be reflected by beamsplitter 280, while light from laser 180 would be transmitted through beamsplitter 280 and be reflected by 28. Thereby almost all the light generated by laser 18 is incident on photodector 340 and light generated by laser 180 on photodetector 34, and almost no light is incident from one laser onto the other. With this technique, the transmitters would be isolated from each other without the use of Faraday isolators 26 and 260, and one could dispense entirely with members 26, 260 if one wished.

As laser diodes have been disclosed with 18 GHz and 25 GHz bandwidth (see, for example, J. Bowers, "Millimetre-Wave Response of InGaAsP Lasers", *Electron Letters*, Volume 21, Number 25/26, Dec. 5, 1985, pages 1195-1197), it will be appreciated that the frequency transmitting capability of transmission system 10 is not a problem.

Each beam splitter 28, 280 splits the laser beams incident thereon into a pass portion and an angularly reflected portion. Thus, the laser beam from the other station 12 or 14 travelling along the optical path is directed to a photodetector means 30 for each station 12. Photodetector means 300 detects intensity variations of the carrier light beam from station 12 and acts as conventional optical diode demodulator to recover the RF #2 signal originally received at 200. Preferably, each photodetector means 30 includes a p-i-n photodetector 34. Such photodetectors 34 have also been demonstrated at 20 GHz bandwidth (See G. Schlafer et al., "20 GHz Band Width InGaAs Photodetector for Long-Wavelength Microwave Optical Links, *Electron Letters*, Volume 21, Number 11, May 23, 1985, pages 469-471) and 37 GHz bandwidth (See G. E. Bowers et al., "In-GaAsP PIN Photodetector With Modulation Response to Milimetre Wavelength" *Electron Letters,* Volume 21, Number 18, Aug. 29, 1985, pages 812-814). Thus, it will be appreciated that the frequency receiving bandwidth required of transmission system 10 is also easily obtained.

As shown, a DC bias 36 is also provided for the output of each photodetector means 30', again to set the device's operating point. It should be appreciated that lenses 24 are required to collimate the light from laser transmitter 16 for transmission over large distances. Similarly, lenses 38 are required to focus the light beam from the other station 12 or 14 to photodetector 34 after the laser beam has been reflected by beam splitter 28.

In operation of transmission system 10, the intensity modulation of laser diode 18 tracks the phases of the input RF electrical signals 20. A RF signal received at 20 intensity modulates the output of laser diode 18, which follows a straight line optical path to beam splitter 280, which in turn reflects it onto detector-demodulator 340, where it is available as a RF output signal at 320. Between beamsplitters 28 and 280, the RF modulated optical signals from laser diodes 18 and 180 traverse the identical path, and thus these signals are inherently phase tracked along this distance. These signals traverse different paths only before passing through members 26, 28 and 260, 280, and after reflection by members 28 and 280. However, it is relatively easy to make these distances small, which permits a technician to trim these paths easily and with great precision so as to maintain phase tracking Initial results at lower frequencies have shown that the phase is independent of the RF amplitude.

Depicted in FIG. 2 is a second embodiment of a transmission system 40. Transmission system 40 is similar to transmission system 10, and thus similar elements of transmission system 40 have been identified with the same numerals as those used to identify the elements in FIG. 1 but with a "'"and such elements shown will not be discussed further. It should be appreciated that transmission system 40 differs primarily from transmission system 10 in the use of a main optical fiber 42 to define the optical path between the stations 12' and 14'. In this embodiment, directional fiber couplers 44 serve as a beam splitter means for the beams directed from the other station 12' or 14'. In the case where laser transmitters operating at different wavelengths are used to provide isolation between transmitters, the embodiment in FIG. 2 uses dichroic directional couplers which are similar to dichroic beamsplitters in that they pass light at one wavelength and couple out into a fiber tap light incident at another wavelength. In using main optical fiber 42, it should also be appreciated that a lens 46 is required to focus the laser beams into main optical fiber 42. In addition, as fiber coupler 44 include a fiber 48 which is directed to photodetectors 34', lenses 38' could simply be formed on fiber 48.

It should be appreciated that transmission system 40 is operated in a similar manner to transmission system 10. However, transmission system 40 simply makes use of fiber optics componentry while transmission system 10 makes use of bulk optics componentry. However, both embodiments achieve the features of phase tracking and bi-directional transmission of radio frequency electrical energy. In addition, both embodiments also provide for concurrent bi-directional transmission of high frequency RF energy.

While the present invention has been described with respect to exemplary embodiments thereof, it will be understood by those of ordinary skill in the art that variations and modifications can be effected within the scope and spirit of the invention.

We claim:

1. A bi-directional optical transmission system comprising:
    first and second transmitter/receiver stations which transmit and receive light signals along an optical path therebetween, each said transmitter/receiver station including;
    a laser transmitter means for transmitting a carrier light beam which is intensity modulated by a synchronization of an input radio frequency electrical signal;
    a photodetector means for detecting intensity variations of the carrier light beam from the other said station and for outputting a respective radio frequency electrical signal whose synchronization is indicative thereof;
    a means provided between (a) said optical path and (b) said laser transmitter means and said photodetector means, for splitting the light beams incident thereon into a passed portion and an angularly reflected portion so that said laser transmitter means and said photodetector means do not interfere with one another.

2. A transmission system as claimed in claim 1, further comprising an isolator means for isolating said laser transmitter means from back reflections, and prevent light from one transmitter from affecting the other transmitter.

3. A transmission system as claimed in claim 1 wherein each said photodetector means includes a photodetector having an active region and a lens which focuses the light beam from the other said station onto the active region of said photodetector.

4. A transmission system as claimed in claim 3 wherein each said laser transmitter means includes a laser diode.

5. A transmission system as claimed in claim 4 wherein each said laser transmitter means further includes a lens which focuses the light beam generated by said laser diode.

6. A transmission system as claimed in claim 3 wherein said optical path includes a main optical fiber.

7. A transmission system as claimed in claim 6 wherein each said beam splitter means includes a fiber coupler coupled to (a) said main optical fiber, (b) a detector optical fiber extending to said photodetector means, and (c) a transmitter optical fiber extending to said laser transmitter means.

8. A transmission system as claimed in claim 7 wherein said lens of each said photodetector means is formed at an end of said detector optical fiber.

9. A transmission system as claimed in claim 8 wherein each said laser transmitter means includes a laser diode, a Faraday isolator which is said isolator means and which is provided between said laser transmitter means and said beam splitter means, a lens which focuses the light beam generated by said laser diode onto said Faraday isolator, and a lens which focuses the light beam exiting said Faraday isolator into said transmitter optical fiber.

10. A transmission system as claimed in claim 1 wherein the synchronization of said input radio frequency electrical energy is a phase synchronization.

11. A transmission system as claimed in claim 1 wherein the synchronization of said input radio frequency electrical energy is a time synchronization.

12. A transmission system as claimed in claim 1 wherein said isolator means is a Faraday isolator provided between said laser transmitter means and said beam splitter means.

13. A transmission system as claimed in claim 1 wherein said means for splitting comprises a first and a second dichroic beam splitter, wherein:

said first dichroic beamsplitter is effective to pass substantially all light from said light beam of said first transmitter/receiver station, and reflect substantially all light from said light beam of said second transmitter/receiver station; and said second dichroic beamsplitter is effective to pass substantially all light from said light beam of said second transmitter/receiver station, and reflect substantially all light from said light beam of said second transmitter/receiver station.

14. A system for phase tracking responsive to the presence of an electromagnetic signal, said signal comprising:

a first transducer means for creating a first optical signal responsive to the presence of said electromagnetic signal;

a second transducer means for creating a second optical signal responsive to the presence of said electromagnetic signal;

a first means for transmitting said first optical signal along a first preselected path to a first preselected place distant from said first or said second transducer means;

a second means for transmitting said second optical signal along a second preselected path to a second preselected place distant from said first or said second transducer means;

wherein at least a portion of said first and said second preselected paths are common, and thus constitute a common path length, effective to cause said first and said second optical signals to traverse said common path length in opposite directions.

15. The system of claim 14, wherein said common path length is an optical fiber.

16. The system of claim 14, wherein said first and said second optical signals are respective first and second laser beams, and said common path length is a distance in free space along the line of sight of said laser beam.

* * * * *